United States Patent [19]
Maslanka

[11] Patent Number: 4,520,159
[45] Date of Patent: May 28, 1985

[54] PROCESS FOR PRODUCING POLYAMINOPOLYAMIDES CONTAINING HALOHYDRIN FUNCTIONALITY

[75] Inventor: William W. Maslanka, Landenberg, Pa.

[73] Assignee: Hercules Incorporated, Wilmington, Del.

[21] Appl. No.: 591,734

[22] Filed: Mar. 21, 1984

[51] Int. Cl.$^3$ ............................................. C08L 77/06
[52] U.S. Cl. .................................... 524/606; 524/538; 524/845; 525/426; 525/432; 525/435; 528/342
[58] Field of Search ...................... 525/426, 435, 432; 528/342; 524/606, 845, 538

[56] References Cited

U.S. PATENT DOCUMENTS

| | | | |
|---|---|---|---|
| 2,926,154 | 2/1960 | Keim | 260/29.2 |
| 3,332,901 | 7/1967 | Keim | 525/430 |
| 4,354,006 | 10/1982 | Bankert | 525/359.5 |
| 4,419,498 | 12/1983 | Bankert | 525/426 |
| 4,419,500 | 12/1983 | Bankert | 525/540 |

Primary Examiner—Harold D. Anderson
Attorney, Agent, or Firm—Hazel L. Deming

[57] ABSTRACT

Disclosed is a novel process for producing water-soluble, cationic resins containing halohydrin functionality from basic polyaminopolyamides containing secondary amine functionality without the use of epihalohydrin. The process of this invention comprises reacting the basic polyaminopolyamide in aqueous medium with an allyl halide to form allyl substituents on tertiary nitrogen atoms, converting the allyl substituents to halohydrin moieties by reaction with hypohalous acid and then maintaining the resulting solution at a pH of at least 7.0 until the Gardner-Holdt viscosity of the solution at 24% solids and 25° C. reaches at least B.

8 Claims, No Drawings

PROCESS FOR PRODUCING POLYAMINOPOLYAMIDES CONTAINING HALOHYDRIN FUNCTIONALITY

This invention relates to a process for producing polyaminopolyamides containing halohydrin functionality on tertiary nitrogen atoms.

Polymeric materials containing halohydrin and particularly chlorohydrin functionality are conventionally produced by the reaction of an epihalohydrin and a polyaminopolyamide containing secondary or tertiary amine groups. They are important wet strength agents for paper and are described, for example, in U.S. Pat. No. 2,926,154 and U.S. Pat. No. 3,332,901 to Keim.

More recently, it is known from U.S. Pat. Nos. 4,354,006; 4,419,498; and 4,419,500 to Bankert that quaternary ammonium compounds containing halohydrin functionality can be produced without the use of epichlorohydrin. In Bankert's process an amino compound containing at least one tertiary amine group is reacted with an allyl halide to quaternize the tertiary amine groups and form allyl substituted quaternary ammonium halide groups, and then the resulting product is reacted with hypohalous acid to convert the allyl substituents to the corresponding halohydrin moieties. Polymeric materials, including aliphatic long chain polyaminopolyamides, which contain tertiary amine groups in the chain unit can be reacted with an allyl halide and then hypohalous acid in this manner to form quaternized polyaminopolyamide containing halohydrin functionality.

Now, in accordance with this invention, it has been found that polyaminopolyamides containing halohydrin functionality present as substituents on tertiary nitrogen atoms can also be produced without the use of epihalohydrin as the alkylating agent. The resulting products possess the advantageous properties of wet strength exhibited by the prior art materials produced with epihalohydrin, and additionally provide economic and environmental advantages which heretofore were not realizable.

Accordingly, the present invention relates to a process for producing an aqueous solution of a polyaminopolyamide containing halohydrin functionality, a major portion of which is present as substituents on tertiary nitrogen atoms, and having a Gardner-Holdt viscosity of at least B when measured at 24% solids at 25° C., which process comprises reacting in aqueous medium a water-soluble basic polyaminopolyamide whose basicity is essentially due to the presence of secondary amine groups with from 1 mole to 1.5 moles of allyl halide per mole of secondary amine groups present in said basic polyaminopolyamide to form allyl substituted tertiary amine groups, removing unreacted allyl halide, reacting the resulting product with hypohalous acid until substantially all of the allyl substituents are converted to the corresponding halohydrin moieties, adjusting the pH of the resulting aqueous solution to at least 7.0 and then maintaining the solution at a pH of at least 7.0 until the viscosity of the polyaminopolyamide containing halohydrin functionality reaches at least B on the Gardner-Holdt scale.

The polyaminopolyamides used in the process of this invention are water-soluble basic polyaminopolyamides whose basicity is essentially due to the presence of secondary amine groups. The polyamide can also contain small quantities of primary and/or tertiary amine groups as well as quaternary ammonium groups. However, to appreciate fully the advantages of this invention at least 70% of the basic nitrogen groups present in the polymer should be secondary amine groups.

The preferred polyaminopolyamides are aliphatic long chain condensation polymers containing units of the formula

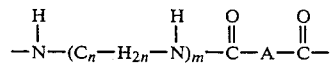

where n and m are integers and are each 2 or more and A is the divalent organic radical of a saturated aliphatic dicarboxylic acid containing at least 4 and more preferably 4 to 8 carbon atoms or esters of saturated aliphatic dicarboxylic acids containing at least two and preferably 2 to 8 carbon atoms. The polyaminopolyamides are readily prepared by reacting a polyalkylene polyamine having two primary amine groups and at least one secondary amine group with a saturated aliphatic dicarboxylic acid such as diglycollic acid, malonic acid, succinic acid, glutaric acid and adipic acid or the mono- or dialkyl esters of the acids at from about 110° C. to about 250° C. for about 0.5 to 2 hours. In carrying out the reaction it is preferred to use an amount of dicarboxylic acid or ester sufficient to react substantially completely with the primary amine groups of the polyalkylene polyamine but insufficient to react with the secondary amine groups to any substantial extent. This will usually require a mole ratio of polyalkylene polyamine to dicarboxylic acid or ester from about 0.8:1 to about 1.4:1 and preferably from about 0.9:1 to about 1.2:1.

Suitable polyalkylene polyamines contain 2 primary amine groups and at least 1 secondary amine group in which the nitrogen atoms are linked together by groups of the formula $-C_nH_{2n}-$ where n is a small integer greater than unity and the number of such groups in the molecule ranges from 2 up to about 8 and preferably up to about 4. The preferred polyamines include diethylenetriamine, triethylenetetramine, tetraethylenepentamine, dipropylenetriamine and the like.

The reaction of a basic polyaminopolyamide whose basicity is due to secondary amine groups with at least a stoichiometric amount of an allyl halide results in alkylation of the secondary amine groups and the formation of nitrogen-containing units which are primarily mono-allyl-substituted tertiary amino groups. Under certain circumstances the reaction may continue further and quaternization of some of the tertiary amine groups may occur. In general, essentially all of the secondary amine groups are mono-alkylated and quaternization is minimized, if the reaction is carried out in water, and preferably at a temperature up to the reflux temperature. The allyl halide, preferably allyl chloride, allyl bromide or allyl iodide, is used in an amount ranging from about 1.0 mole to about 1.5 moles and preferably from about 1.2 to about 1.3 moles per mole of secondary amine present in the basic polyaminopolyamide.

When the desired degree of alkylation is complete, unreacted allyl halide is removed and the allyl substituents are reacted with hypohalous acid and preferably hypochlorous acid, hypobromous acid or hypoiodous acid in aqueous medium to convert the allyl substituents to halohydrin moieties. Hypohalous acid can be prepared in advance or generated in situ by methods well known to the art. One convenient method for preparing hypochlorous acid involves bubbling $CO_2$ through a solution or dispersion of a hypochlorite of sodium, potassium, calcium or magnesium in methyl ethyl ketone/water. Another method involves bubbling chlorine gas into water or the aqueous solution of the allyl-substituted polymer, with or without pH adjustment. Yet another method involves dissolving chlorine monoxide in water. Preferably, the conversion of the allyl substituents to halohydrin moieties by hypohalite addition is carried out at a pH below about 7.0 and preferably at about 1 to about 6.5 and at a temperature within the range of about −10° to about 15° C. and preferably from about −3° C. to about 5° C.

The resulting solution of polyaminopolyamide containing halohydrin functionality is next adjusted to a pH of at least 7.0, preferably 7.5 to 10, and the solution is maintained at a pH of at least 7.0 and preferably at a temperature of about 25° to 60° C. until the viscosity of the polyaminopolyamide containing halohydrin functionality reaches at least B on the Gardner-Holdt scale when measured at 24% solids at 25° C. When the desired viscosity is reached, the reaction is terminated by adding water, usually in an amount to adjust the solids content to about 25% or less. The product can be used as such but is generally stabilized by adjusting the pH to about 5 or below.

If desired, a polyfunctional amine which is bifunctionally reactive with the polyaminopolyamide containing halohydrin moieties in aqueous solution at a pH of at least 7.0 can be added either before, during or after pH adjustment to promote the build-up of molecular weight via limited cross-linking. Polyfunctional amines of this type include ammonia, primary amines, secondary amines, alkylene diamines, polyalkylene polyamines, aromatic diamines, heteroaromatic diamines, heterocyclic aliphatic diamines, polyetherpolyamines, aliphatic long chain polyaminopolyamides containing secondary amino nitrogens, polyaminoureylenes containing secondary amino nitrogens, homopolymers or copolymers of diallylamine, homopolymers or copolymers of aminoalkyl- or aminohydroxyalkyl acrylates or methacrylates, aliphatic straight chain aminopolyesters containing secondary amino nitrogens, condensation polymers of a polyfunctional amine and dicyandiamide, and the like. The preferred polyfunctional amines are polyamines containing at least two primary and/or secondary amine groups and more preferably are polyalkylene polyamines containing 2 primary amine groups and at least 1 secondary amine group in which the nitrogen atoms are linked together by groups of the formula —$C_nH_{2n}$— where n is a small integer greater than unity and the number of such groups in the molecule ranges from 2 up to about 8 and preferably up to about 4, or the condensation polymers of these polyalkylene polyamines with saturated aliphatic dicarboxylic acids. The most preferred condensation polymers are the basic polyaminopolyamides which are the starting polyaminopolyamides for the process of this invention.

The presence of up to about 75 mole %, preferably from about 10 to about 50 mole % and more preferably from about 15 to about 35 mole % of a polyfunctional amine based on the polyaminopolyamide containing halohydrin functionality during the final step of the process of this invention has been found to promote molecular weight build-up and provide polymeric materials exhibiting good wet strength properties.

The products of this invention are particularly useful as wet strength agents for paper following activation by the addition of an amount of base, either as a solid or as a solution, sufficient to convert the halohydrin moieties to the active azetidinium and/or epoxide groups. This will usually require an amount of base approximately chemically equivalent to the amount of halogen present. However, up to about 2 times this amount can be used. Both organic and inorganic bases can be used for activation. Typical bases which can be used are the alkali metal hydroxides, carbonates and bicarbonates, calcium hydroxide, pyridine, benzyltrimethylammonium hydroxide, tetramethylammonium hydroxide and mixtures thereof.

The activated polymeric solutions can be applied to paper or other felted cellulosic products by tub application or by spraying, if desired. Thus, for example, preformed and partially or completely dried paper can be impregnated by immersion in, or by spraying with the aqueous solution, following which the paper can be heated for about 0.5 minute to 30 minutes at temperatures of 70° C. to 110° C. or higher to dry the same and convert the polymer to a water-insoluble condition. The resulting paper has improved wet and adequate dry strength, and therefore this method is well suited for the impregnation of paper to be used as wrapping paper, bag paper and the like.

The preferred method of incorporating the polymeric materials in paper, however, is by internal addition prior to sheet formation, whereby advantage is taken of the substantivity of the polymers for hydrated cellulosic fibers. In practicing this method, the activated solution is added to an aqueous suspension of paper stock in the beater, stock chest, Jordan engine, fan pump, head box or at any other suitable point ahead of sheet formation. The sheet is then formed and dried in the usual manner.

The "off-the-machine" wet strength obtained with the polymeric compounds of the invention will be satisfactory for most applications. Additional wet strength can be obtained by subjecting the paper to a heat treatment of the order of from about 80° C. to about 150° C. for a period of time from about 12 to 60 minutes, time varying inversely with temperature.

While the polymeric compounds herein described impart substantial wet strength to paper they also provide adequate dry strength when present therein in relatively small amounts, i.e., about 0.01% or more, based on the dry weight of the paper. Generally, it will be desirable to use from about 0.1–3% by weight, based on the dry weight of the paper. However, amounts up to 5% or more can be used if desired.

The products of this invention are also useful as curing or crosslinking agents for paints and related products and particularly carboxylated latices.

The invention is further illustrated by the following examples which demonstrate the best known embodiments of the invention. In these examples, all percentages are by weight and all viscosity measurements were determined at 25° C., intrinsic viscosity being determined on a 2% solution in aqueous 1 molar ammonium chloride and Brookfield viscosity being determined using a No. 2 spindle at 60 r.p.m., unless otherwise indicated.

EXAMPLE 1

Part 1

A reaction vessel equipped with an agitator, thermometer, heating mantle, addition funnel and condenser was charged with 215.9 grams (0.5 mole) of a 49.4% aqueous solution of a polyaminopolyamide derived from substantially equal molar amounts of diethylenetriamine and adipic acid (intrinsic viscosity of 0.157) and with 470.4 grams of water. Agitation was commenced and 38.25 grams (0.5 mole) of allyl chloride were added to the charge dropwise at a constant rate over a period of 20 minutes while keeping the temperature at 23°-25° C. The resulting mixture was next heated and maintained at reflux temperature (45°-46° C.) for 5 hours, following which time the mixture was subjected to vacuum to remove unreacted allyl chloride. The resulting solution contained 22.2% polymer solids and 91.8% of the secondary amine groups were alkylated.

Part 2

A portion (208.4 grams) of the solution prepared in Part 1 was transferred to a reaction vessel, agitation was commenced, the contents were cooled to −1.5° C. and 243.8 grams of a 3.23% cold solution of hypochlorous acid in methyl ethyl ketone were added over a one hour period while maintaining the temperature of the mixture below 3.5° C. Agitation was continued for 2 hours at about 3.5° C., after which time the mixture was permitted to warm to room temperature and agitation was continued overnight. At this point the amount of hypochlorous acid consumed indicated that 89.9% of the allyl substituents were converted to chlorohydrin moieties. Sodium bisulfite (1.59 grams) was added to the resulting solution to remove residual hypochlorous acid and the methyl ethyl ketone was removed from the solution by separation and then evaporation. The final resin solution contained 23.1% solids and the resin had a Garnder-Holdt viscosity of less than A.

The hypochlorous acid solution used in this example was separately prepared by adding in 3 portions over a 30 minute period a total of 31.8 grams of calcium hypochlorite (65% purity) to a stirred mixture of 270 ml of methyl ethyl ketone and 30 ml of water at 0° C. using a constant $CO_2$ sparge, continuing the agitation and sparge for 30 minutes and then filtering the resulting mixture.

Part 3

A portion (72.5 grams) of the resin solution of Part 2 was transferred to a reaction vessel, agitation was commenced, the pH was adjusted to 7.5 with 5M NaOH and the solution was maintained at 30°-31° C., while monitoring the viscosity. When the Spence-Spurlin viscosity reached 13.1 seconds (Gardner-Holdt viscosity of B-C), 110.6 grams of water were added and the pH was adjusted to 4.1 with concentrated sulfuric acid. The resulting solution contained 9.65% polymer solids.

EXAMPLE 2

The procedure of Example 1, Part 3 was repeated except that monitoring was carried out until the Spence-Spurlin viscosity was 23.9 seconds (Gardner-Holdt viscosity of E-F). The resulting solution had a solids content of 9.62%.

EXAMPLES 3 AND 4

The products of Examples 1 and 2 were evaluated as wet and dry strength agents for paper. In this evaluation, a 50:50 blend of Rayonier bleached kraft pulp and Weyerhaeuser bleached hardwood kraft pulp was beaten at 4.4% consistency in a cycle beater to a Canadian standard freeness of 500 cc. The pH of the pulp was adjusted to 7.5 and the pulp was diluted to 0.266% consistency in the proportioner of a standard Noble & Wood handsheet machine. The solutions of Examples 1 and 2 were activated for use by the addition of sodium hydroxide to give a pH of 10-11 and then each solution was added to the proportioner as a 2% solids solution to give 0.25%, 0.5% or 0.75% of resin based on pulp. The pulp stock was then formed into handsheets having a basis weight of about 40 pounds per 3000 square feet and the sheets were dried to a moisture content of about 5%. A portion of each sheet was then given an additional cure by heating for 30 minutes at 80° C. The dried (uncured) and heated (cured) sheets were tested for dry strength and for wet strength (after soaking for 2 hours at 20° C. in distilled water). The results of the wet and dry tensile strength evaluations are tabulated below. Also included in Table 1 are the results obtained on handsheets from untreated pulp (blank).

TABLE 1

| Example | Resin Solution from Ex. | % Resin Added[1] | Basis Weight (lbs/3000 ft[2]) | Tensile Strength (lbs/inch width)[2] | | | |
|---|---|---|---|---|---|---|---|
| | | | | Dry | | Wet | |
| | | | | Uncured[3] | Cured | Uncured[3] | Cured |
| 3 | 1 | 0.25 | 40.2 | 18.3 | 19.2 | 1.17 | 1.34 |
| | | 0.50 | 40.4 | 19.1 | 20.3 | 1.62 | 1.93 |
| | | 0.75 | 40.5 | 18.9 | 20.4 | 2.04 | 2.38 |
| 4 | 2 | 0.25 | 40.6 | 18.2 | 20.2 | 1.26 | 1.35 |
| | | 0.50 | 40.7 | 18.7 | 19.1 | 1.78 | 2.11 |
| | | 0.75 | 40.3 | 19.6 | 19.5 | 2.04 | 2.27 |
| Blank | — | — | 40.3 | 18.3 | 18.2 | 0.57 | 0.60 |

[1]Based on dry pulp weight
[2]Average of 4 determinations
[3]After 2 days of natural aging

EXAMPLE 5

The product of Example 2 was also evaluated as a cross-linking agent for carboxylated latices. In this evaluation a 100 gram sample of a commercial carboxylated latex (Dow Latex 283) having a total solids of 44% and a pH of 8.6 was intimately mixed with a cross-linking amount of the solution of Example 2 and the latex sample was set aside. The viscosity of the sample was measured initially and then after 8 and after 13 days of storage. The results of the evaluation are given below in Table 2.

TABLE 2

| % Resin Added[1] | Initial pH | Brookfield Viscosity, cps | | |
|---|---|---|---|---|
| | | Day 0 | Day 8 | Day 13 |
| 0.5 | 8.4 | 100 | 105 | 105 |
| 1.0 | 8.3 | 325 | 345 | 347 |
| — | 8.6 | 67.4 | 62.5 | 62.5 |

[1]based on latex solids

EXAMPLE 6

The procedures of Example 1, Parts 1 and 2 were repeated, giving a resin solution having a total solids of 27%. A portion (74.1 grams) of the solution and 35 grams of water were placed in a reaction vessel equipped with an agitator, thermometer and heating means. Agitation was commenced, the pH was adjusted to 9.0 with 5M NaOH and 5.8 grams of a 50.34% solution of a polyaminopolyamide derived from substantially equal molar amounts of diethylenetriamine and adipic acid (intrinsic viscosity of 0.142) were added. The contents of the vessel were heated to 50°–57° C. and when the Gardner-Holdt viscosity reached E, 69 grams of water were added and the pH was adjusted to 4.7 with concentrated sulfuric acid. The resulting solution contained 13.55% polymer solids and had a Brookfield viscosity of 34 cps.

EXAMPLE 7

The product of Example 6 was evaluated in handsheets using the procedure of Examples 3 and 4. The results of the wet and dry strength evaluations are summarized below in Table 3.

TABLE 3

| Example | Addition Level[1] | Basis Weight | Tensile Strength (lbs/inch width) | | | |
|---|---|---|---|---|---|---|
| | | | Dry | | Wet | |
| | | | Uncured | Cured | Uncured | Cured |
| 7 | 0.25 | 40.4 | 17.9 | 17.9 | 1.52 | 1.56 |
| | 0.50 | 40.6 | 18.4 | 19.1 | 2.08 | 2.17 |
| | 0.75 | 40.4 | 19.2 | 19.3 | 2.58 | 2.76 |
| Blank | — | 40.6 | 18.9 | 18.7 | 0.54 | 0.56 |

[1] % resin based on dry pulp weight

What I claim and desire to protect by Letters Patent is:

1. A process for producing an aqueous solution of a cationic resinous composition suitable as a wet strength agent for paper and containing a polyaminopolyamide having a major portion of halohydrin functionality as substituents on tertiary nitrogen atoms, which process comprises reacting in aqueous medium a water-soluble basic polyaminopolyamide derived from a polyalkylene polyamine having two primary amine groups and at least one secondary amine group and a saturated aliphatic dicarboxylic acid or its ester and having a basicity essentially due to secondary amine groups with from 1 mole to 1.5 moles of allyl halide per mole of secondary amine groups in said basic polyaminopolyamide to form allyl substituted tertiary amine groups, removing unreacted allyl halide, reacting the resulting allyl substituted polyaminopolyamide with hypohalous acid until substantially all of the allyl substituents are converted to the corresponding halohydrin moieties, adjusting the pH of the resulting aqueous solution to at least 7.0 and maintaining the solution at a pH of at least 7.0 until the viscosity of the polyaminopolyamide containing halohydrin functionality reaches at least B on the Gardner-Holdt scale when measured at 24% solids at 25° C.

2. The process of claim 1 wherein the allyl halide is allyl chloride.

3. The process of claim 2 wherein the hypohalous acid is hypochlorous acid.

4. The process of claim 3 wherein the basic polyaminopolyamide is derived from a polyalkylene polyamine containing 2 to 8 carbon atoms and a saturated aliphatic dicarboxylic acid containing 4 to 8 carbon atoms, the mole ratio of polyalkylene polyamine to dicarboxylic acid being from about 0.8:1 to about 1.4:1.

5. The process of claim 4 wherein the polyalkylene polyamine is diethylenetriamine and the dicarboxylic acid is adipic acid.

6. The process of claim 1 wherein the resulting aqueous solution is adjusted to a pH of at least 7.5 and is maintained at a pH of at least 7.5 and a temperature within the range of about 25° to 60° C. until the viscosity reaches at least about C on the Gardner-Holdt scale when measured at 24% solids at 25° C.

7. The process of claim 6 wherein the resulting aqueous solution also contains from about 10 to about 50 mole % of a polyfunctional amine containing at least 2 amine groups selected from the group consisting of primary and secondary amine groups, based on the polyaminopolyamide containing halohydrin functionality.

8. The process of claim 7 wherein the polyfunctional amine is a basic polyaminopolyamide having a basicity essentially due to secondary amine groups.

* * * * *